Jan. 7, 1958 D. B. PALL ET AL 2,819,209
POROUS ARTICLES OF FLUOROETHYLENE POLYMERS
AND PROCESS OF MAKING THE SAME
Filed Nov. 15, 1952
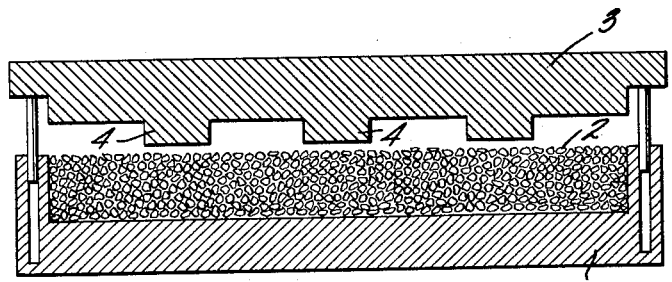
FIG. I.
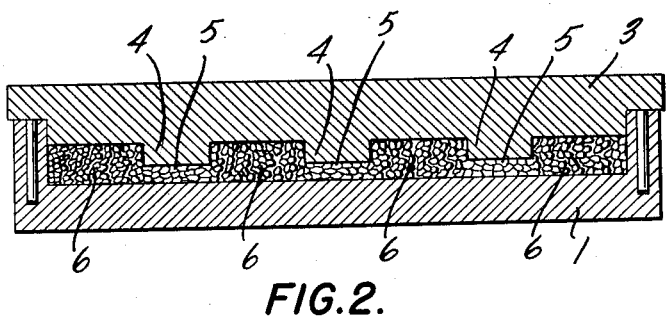
FIG. 2.
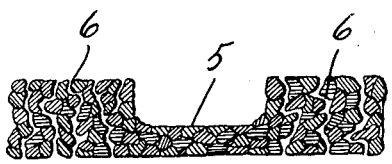
FIG. 3.
FIG. 4.
INVENTORS
DAVID B. PALL &
SIDNEY KRAKAUER
BY
Brumbaugh, Free, Graves + Donohue
their ATTORNEYS

# 2,819,209

United States Patent Office

Patented Jan. 7, 1958

2,819,209

POROUS ARTICLES OF FLUOROETHYLENE POLYMERS AND PROCESS OF MAKING THE SAME

David B. Pall, Roslyn Heights, and Sidney Krakauer, Franklin Square, N. Y.; said Krakauer assignor to said Pall Application November 15, 1952, Serial No. 320,807

19 Claims. (Cl. 210—510)

This invention relates to a process for preparing fluid-permeable filters of fluoroethylene polymers and to the filters thus obtained and more particularly to a process of preparing filters of fluoroethylene polymers which filters are nonporous in selected areas.

Polytetrafluoroethylene and polychlorotrifluoroethylene are two types of fluoroethylene polymers which have come into wide use because of their extremely high chemical and heat resistance. They are not attacked by caustic and acid solutions and by most organic solvents even at elevated temperatures. These properties have suggested their value as filters for such materials, but the formation of commercially practicable filters has proved difficult.

It has been proposed that the polytetrafluoroethylene and polychlorotrifluoroethylene be ground to a suitably finely-divided powder and that this be pressed at pressures of the order of 1500 p. s. i. or higher and at room temperature to prepare a sheet which then is brought to a sintering temperature in an oven without confinement, i. e. in the open. The compacting at high pressures imparts to the sheet a degree of cohesiveness so that it retains its form sufficiently to permit handling but also reduces the porosity to an appreciable extent. During sintering the particles soften and expand and the porosity of the sheet increases. Because the softened particles tend to flow, the filter which is eventually obtained may be nonuniform in thickness and also in porosity. Further, the cold pressing operation requires special, expensive equipment and this in turn limits the shapes and sizes of filters which can be prepared to those which are capable of being produced by the available equipment. It is also difficult to prepare filters of high porosity since a limiting factor is the high pressure which must be applied initially to produce a sheet which will withstand handling.

In accordance with the instant invention, filters of fluoroethylene polymers are prepared by confining a layer of polyfluoroethylene particles in a mold having inert nonadhering surfaces of any desired configuration and then sintering the layer at a temperature above the softening point but below the melting or decomposition point of the particles while applying moderate pressure to the layer through at least one of the surfaces to reduce and hold the layer to a predetermined thickness. In this way the layer is confined to uniform dimensions and its volume or thickness is reduced in one dimension, with a corresponding increase in density. As this occurs the softened particles are brought into adhesive contact with each other. When the mass is cooled to below the softening point of the polymer as, for example, by quenching the mold, the mass hardens, forming a network of united particle aggregates, and a porous filter is obtained corresponding in external configuration to the shape of the confining surfaces.

In one preferred embodiment of the invention the filter is provided with nonporous areas, desirably interconnected but not necessarily, to increase the tensile strength and durability of the filter. For obvious reasons a wholly porous sheet of sintered fluoroethylene polymer particles has a lower tensile strength than a nonporous sheet of the same particles. A filter composed of interconnected nonporous areas and spaced porous areas therebetween has a greater strength and durability than a wholly porous layer because the porous areas are held together by the stronger nonporous areas. Such a filter may in fact closely approach a wholly nonporous sheet in strength.

In accordance with the invention filters having both porous and nonporous areas are prepared by using confining surfaces of appropriate raised and recessed (waffle-like or hill-and-dale) configuration or by sintering layers of nonuniform density or nonuniform thickness between plane or flat confining surfaces, or surfaces of other configurations. Those areas of the layer which are to be nonporous in the final product will have or acquire during sintering a sufficiently higher density to be transformed into a nonporous structure while the particles in the remaining areas will be united into aggregates defining a porous structure. Any combination of these expedients can also be used, as will be evident from the ensuing discussion.

Microscopic observation of filters in accordance with the invention shows that the distribution of pores is uniform from one face of the filter to the other. In the case of filters prepared by cold compacting, high density areas of low pore content are formed near both surfaces, with more porous material in between. For filters made by the two processes, of equal average void content, and of equal maximum pore size, flow capacity is higher for the filter made by the process of the invention.

During sintering pressure is applied to reduce the thickness of the layer to a predetermined thickness which is the thickness of the desired filter and the pressure need not be any greater than that required to close the surfaces upon the layer while the particles are soft and plastic or deformable to this predetermined gap between the surfaces. Higher pressures, for example 300 p. s. i., can be used if desired but will serve only to speed the closing of the gap since once the limiting thickness has been reached the surfaces can approach each other no more closely. Pressures of the order of 30–50 p. s. i. usually are adequate.

The apparatus can be fitted with stops to limit the thrust of the confining surfaces to the desired gap therebetween.

In sintering, the layer of particles is formed on one of the confining surfaces in the desired weight per unit area of mold surface measured at right angles in the direction of pressing, with or without tamping of selected areas to be nonporous, as desired. The other surface then is brought to bear upon the layer and pressure applied without compressing or compacting the layer to any appreciable extent until the layer is heated. As the particles become soft the confining surfaces approach each other more closely until eventually the limiting gap is reached. Sintering then is continued at the desired temperature until adhesion of the particles to each other is complete. The layer, now a finished filter, then is cooled until hard and the finished filter is removed.

The filter can be cooled quickly by quenching the confining surfaces although this is not necessary. It has been found that rapid cooling of polychlorotrifluoroethylene, as by quenching, will produce filters whose nonporous areas are transparent while a filter which has been cooled slowly will have translucent or opaque nonporous areas. In other respects, however, the filters are equivalent.

Any conventional molding equipment can be used. The confining surfaces should be inert and non-adhering, and can be flat or plane surfaces, or can have any desired regular or irregular configuration, and can be provided with raised and/or recessed portions.

The process of the invention is applicable to any fluoroethylene polymer which can be softened and/or fused by heat without decomposition. The term "fluoroethylene polymer" is used to refer to any polymer of a fluoroethylene having at least one fluorine atom. Polymers of the tetrahalogenated ethylenes are preferred and especially these tetrahalogenated ethylenes having three fluorine atoms and one chlorine atom or four fluorine atoms.

Polytetrafluoroethylene has no true melting point but undergoes a transition from its solid phase to a soft adhesive state at 620° F., decomposing at approximately 750° F. Thus, this material can be formed into filters in accordance with the process by heating to temperatures within the range from 620° to 750° F. Similarly polychlorotrifluoroethylene can be formed into filters by heating at temperatures within the range of 450° F. to its melting point. It will be appreciated that these temperatures may vary somewhat with individual samples of the resins since they are dependent upon the degree of polymerization of the resin. In general, mold temperatures within the range of 450° to 700° F. can be used, depending upon the polymer.

The particle size of the resin is not critical and filters can be formed from resins of any particle size. The larger the particle size the greater the pore size of the filter obtained and, correspondingly, the greater the permeability. For optimum results the particles should pass a 30–90 mesh screen.

The layer of particles can be of any thickness depending upon the desired thickness of the filter, bearing in mind that the thickness of the layer will be reduced in sintering to impart the necessary cohesiveness and permeability to the filter. The greater the thickness of the layer, the more important the rate of heating during sintering. The rate should be slow and uniform enough so that the entire layer is uniformly heated as it is compressed due to application of pressure. Also, the greater the thickness of the layer, the more difficult it becomes to obtain a product of uniform permeability. Layers of thickness up to about ½ inch are readily sintered using rapid rates of heating and readily yield filters of uniform permeability. Usually the thickness is diminished by ¼ up to about ¾, but the upper limit is not critical. The greater the reduction in thickness, the lower the permeability and pore size of the filter. A satisfactory compromise between permeability and tensile strength is obtained by reducing the thickness of the layer by approximately ½ to ⅔.

It will be appreciated from the above considerations that filters of any desired percentage of voids and pore size can be prepared by an appropriate selection of particle size and reduction in thickness of the particle layer, and that these conditions are not critical in any way but will be chosen to meet the particular need. Usually the product has up to 75% voids.

In preparing a nonporous area, the density of the layer also is important. There should be a sufficient number of particles in the area which is to be nonporous to effect a complete fusing of the layer in that area during sintering under the same conditions of heat and pressure at which a porous structure is formed elsewhere in the filter. The number of particles (particle density) in the areas to be nonporous can be increased relative to the porous areas by tamping such areas of the layer under moderate pressure and then adding more particles to the tamped areas. The tamping can be repeated one or more times, as necessary to increase the particle density to a point at which the tamped area will be nonporous after sintering. By this method it is possible to produce filters having nonporous and porous areas at different levels, either the nonporous or the porous areas being raised, relative to the other, using confining surfaces having raised and/or recessed portions. If flat confining surfaces are used, the porous and nonporous areas of course will be at the same level.

Alternatively, a layer can be prepared in which the areas are of nonuniform thickness initially, the layer being thickest in the areas which are to be nonporous. This alternative procedure, however, involves building up areas of differing thicknesses composed of particles which collectively have no dimensional stability and tend to flow upon each other, and is not well adapted to produce filters with sharply-defined nonporous and porous areas, a disadvantage not found in the tamping method.

In another alternative procedure the layer can be of uniform thickness and is sintered while confining the layer between surfaces having raised and/or recessed (waffle-like or hill-and-dale) portions so that under a given pressure to a limiting stop point certain areas of the layer are compressed more than others. Using a recessed surface, by appropriately establishing the depth of the limiting thrust of the surface into the layer and the depth of the recessed areas in the confining surface the areas compressed the most can be rendered nonporous while the areas extending into the recesses of the die surface can be sintered in a porous structure.

A combination of these three methods can also be used.

Figures 1 and 2 of the drawings show the preparation of a filter having porous and nonporous areas in accordance with the last-described method. The mold 1 shown in Figures 1 and 2 is adapted to receive a layer 2 of particles of fluoroethylene polymer. The upper plate 3 of the mold has waffle-like raised and recessed portions 4. Thus, when the mold is closed as shown in Figure 2 to the limiting stop point, the areas 5 of the layer 2 beneath the raised portions 4 of the mold are compressed more than the remaining portions 6 of the layer. Under application of heat sufficient to sinter the fluoroethylene polymer at the pressure applied within the range from 30 to 50 pounds per square inch, the areas 5 become nonporous while the areas 6 remain porous, and the particles are sintered together to form the final filter. After cooling, the filter can be removed from the mold, and it will then have the appearance shown in Figure 3.

If the entire filter is to be porous, the upper portion of the mold should be perfectly flat, without the raised portions 4, and as a result the layer during application of heat and pressure is subjected to the same pressure throughout and will remain porous. The resulting structure is shown in Figure 4.

At the transition zone between non-porous and porous areas, stress concentrations may result in a weakened structure if the transition is too abrupt. The tamping and refilling procedure may be used to concentrate sufficient powder under the area to be made nonporous, so that some of the material extrudes into the porous area, thereby providing a gradual transition from one area to the other, and avoiding the weakening effect of stress concentration.

The invention is illustrated in the following examples.

The polytetrafluoroethylene used in these examples was prepared for sintering by heating at 750° F. until fused. The mass was pulverized twice in a high speed rotary hammer mill and screened through a 50 or 90 mesh filter.

EXAMPLES 1 TO 11

Seven filters were prepared, four using powdered polytetrafluoroethylene which passed a 90 mesh sieve and three using 50 mesh polytetrafluoroethylene. In preparing each filter the powder was distributed to a depth of 0.174 inch in a flat-bottomed female mold of stainless steel 0.174 inch deep coated with Dow Corning silicone resin DC–993 to prevent sticking. The male portion of the mold had a flat surface.

The top of the mold was brought down upon the layer of polytetrafluoroethylene at a pressure of 30 to 50 p. s. i. and the mold brought to a temperature of 670° to 690° F. As the polytetrafluoroethylene softened, the top portion of the mold sank into its limiting position, and the layer was reduced to about two-fifths of the original layer thickness. The layer was sintered while confined in the mold at this temperature for sixty minutes. The mold was quenched and the filter removed. The filters thus obtained were flat discs.

Four additional filters were prepared, three using 90 mesh polytetrafluoroethylene and one 50 mesh polytetrafluoroethylene, by the following procedure: The powder was distributed on a flat rectangular polished chrome platen to a depth of 0.125 inch. A similar platen was placed on top and the layer pressed at 1500 p. s. i. at room temperature. Two of these filters were sintered at 670° to 690° F. without confinement, one filter being of 50 mesh polytetrafluoroethylene and the other of 90 mesh polytetrafluoroethylene. One of the remaining filters of 90 mesh polytetrafluoroethylene was sintered at the same temperature under a pressure of 8 grams/in.$^2$ and the third filter of 90 mesh polytetrafluoroethylene was sintered at the same temperature under a pressure of 43 grams/in.$^2$.

All of the filters were tested for tensile strength, pore size and permeability to fluids. Maximum pore size was determined by bubble point measurements. The filter was immersed in ethyl alcohol until the pores were filled with alcohol. The filter then was placed in a jig and air applied to one side while a 1 mm. depth of alcohol was maintained on the other side. The air pressure in millimeters necessary to cause the first bubble to appear on the alcohol side of the filter was called the bubble point. The water-equivalent bubble point was calculated by multiplying by 3.27, the ratio of the surface tension of water to alcohol.

The figures as obtained are inversely proportional to the diameters of maximum pore opening through the filter, and may be used to calculate the diameter of a circular capillary which would have the same bubble point. As used here, higher bubble point indicates smaller maximum pore opening in a filter. The permeability was determined by pressure drop of air through the filter. The flow of air was measured as standard cubic feet per hour per 0.8 square inch area and converted to standard cubic feet per minute per square foot of filter area at one p. s. i. differential pressure.

The following results were obtained:

so that the perimeter of a layer of material in the female portion of the mold would be compressed to a greater extent than the center portion of the mold. The recess thus defined in the center part of the male portion of the mold was .050 inch deep.

The polytetrafluoroethylene powder of 90 mesh size was filled into the female portion of the mold to a depth of 0.174 inch. The male member of the mold was put in place and the layer then was brought to the sintering temperature at 680° F. while a pressure of 30 to 50 p. s. i. was applied to the male member. As the powder became soft, the male member compressed the layer and eventually came to rest at a limiting point at which the perimeter was of minimum thickness at that pressure and the central portion of the layer within the recess of the mold had been reduced to about three-fifths its original volume. Heating at the sintering temperature was continued for one hour.

The filter obtained from this mold had a solid rim corresponding to the raised ridge on the male member of the mold and a porous central portion corresponding to the recessed part of the male member of the mold.

The filters obtained had the following properties: The strength of this filter at the edges was such that it was impossible to tear it by hand. By comparison, a disc made in the same way but porous to the edges could easily be torn between the fingers.

EXAMPLE 13

A filter was prepared from polychlorotrifluoroethylene using an apparatus similar to that described in Example 12. The same procedure was followed. The initial layer was ⅜ inch thick. The sintering temperature was 500° F. and sintering was continued for one-half hour. The porous area of the filter was 0.125 inch thick and the non-porous area was .045 inch thick. The filter could not be torn at the outer edge by hand. It had a bubble point of 18 and the air flow at 1 p. s. i. differential was 300 C. F. M./sq. ft. Tensile strength was 900 p. s. i.

EXAMPLE 14

A filter of polychlorotrifluoroethylene was prepared

*Table I*

| Example No. | 1 | 2 | 3 | 4 | 5 | 6 | 7 | 8 | 9 | 10 | 11 |
|---|---|---|---|---|---|---|---|---|---|---|---|
| Process Data: | | | | | | | | | | | |
| Material size (mesh [1]) | 90 | 90 | 90 | 90 | 50 | 50 | 50 | 90 | 90 | 90 | 50 |
| Pressure applied cold before sintering (p. s. i.) | 0 | 0 | 0 | 0 | 0 | 0 | 0 | 1,500 | 1,500 | 1,500 | 1,500 |
| Pressure during sintering (p. s. i.) | 30-50 | 30-50 | 30-50 | 30-50 | 30-50 | 30-50 | 30-50 | 0 | 8 g./in.$^2$ | 43 g./in.$^2$ | 0 |
| Sintering temperature (°F.) | 670 to 690 | 670 to 690 | 670 to 690 | 670 to 690 | 670 to 690 | 670 to 690 | 670 to 690 | 670 to 690 | 670 to 690 | 670 to 690 | 670 to 690 |
| Sintering time (minutes) | 1 hour | 1 hour | 1 hour | 1 hour | 1 hour | 1 hour | 1 hour | 1 hour | 1 hour | 1 hour | 1 hour |
| Filter Data: | | | | | | | | | | | |
| Depth of die and thickness of initial layer (inches) | .174 | .174 | .174 | .174 | .174 | .174 | .174 | .125 | .125 | .125 | .125 |
| Approx. thickness of finished filter (inches) | .094 | .174 | .073 | .066 | .082 | .073 | .062 | .073 | .071 | .070 | .072 |
| Tensile strength (p. s. i.) | 40 | 110 | 230 | 425 | 210 | 240 | 340 | 150 | 315 | 345 | 190 |
| Water bubble point (mm. Hg) | 33 | 43 | 52 | 82 | 30 | 40 | 46 | 46 | 59 | 62 | ------ |
| Air flow at 1 p. s. i. differential (C.F.M./sq. ft.) | 207 | 160 | 130 | 62 | 146 | 133 | 87 | 78 | 43 | 48 | 70 |

[1] Material passes through this mesh.

Examples 1 to 7, which were prepared in accordance with the invention with application of slight pressure during sintering, had a high permeability as evidenced by the air flow, and a smaller pore size, as evidenced by the larger bubble point. The filters of the invention had a higher tensile strength and permeability and smaller pore size than the filters prepared by applying pressure prior to sintering and then sintering under no or slight pressure, as is evidenced from a comparison of Examples 3 with 8, Examples 4 with 9 and 10, and Examples 5, 6 and 7 with 11, which are filters of about the same thickness.

EXAMPLE 12

A filter was prepared using polytetrafluoroethylene powder. A circular mold was used. The face of the male portion of the mold had a raised ridge portion extending all the way around the perimeter of the face of the mold using a mold of Example 12. The layer of polychlorotrifluoroethylene powder was filled in the female member of the mold as before to a depth of 0.39 inch. A steel ring fitting closely against the inside wall of the mold around the perimeter of the layer was placed in the mold and 50 p. s. i. pressure applied to compress the perimeter of the layer without compressing the center portion of the layer. The ring was removed and the layer then brought to a uniform depth by adding additional powder to the compressed perimeter portion. A male member of the mold with raised periphery then was brought to bear upon the layer and about 50 p. s. i. pressure applied while the mold was heated to 500° F. The male mold descended to a stop fixed to hold the center part of the layer to a thickness of 0.15 inch, and the sintering continued for one-half hour. The mold was quenched and the filter removed.

In this case since the male die has a recessed section, a filter having a raised central portion is obtained 0.150 inch thick while the perimeter which had been compressed by the ridge of the disc was nonporous and 0.100 inch thick. The filter could not be torn at the outer edges by hand, and had a bubble point of 20, an air flow at 1 p. s. i. differential of 350 C. F. M./sq. ft., and a tensile strength of 850 p. s. i.

Using a method of the prior art, a mold 3/16 inch deep and 2 inches in diameter was filled with polychlorotrifluoroethylene. A flat faced male die was placed in the filled cavity and the powder compressed at 1000 p. s. i. The male die was then removed and the compress placed in an oven at 450° F. for forty minutes.

This resultant wafer exhibited virtually impervious upper and lower surfaces, with only the core being porous. Such a condition was never encountered with materials made by any of the processes in accordance with the invention herein described.

EXAMPLE 15

A filter of polychlorotrifluoroethylene was prepared using a mold having flat-faced male and female dies. The layer of polychlorotrifluoroethylene powder (50 mesh) was filled in the female portion of the mold as before. A steel ring fitting closely against the inside wall of the mold around the perimeter of the layer was placed in the mold and 50 p. s. i. pressure applied to compress the perimeter of the layer without compressing the center portion of the layer. The ring was removed and the layer then brought to a uniform depth by adding additional powder to the compressed perimeter portion. Again the ring was inserted and 50 p. s. i. pressure applied upon the perimeter of the layer. The layer again was brought to uniform depth by adding powder to the depressed perimeter portion. The male member of the mold then was brought to bear upon the layer and about 50 p. s. i. pressure applied while the mold was heated to 450° F. sintering temperature. The male mold descended to a stop fixed to hold the layer to a thickness of 1/8 inch, and the sintering continued for three-fourths of an hour. The mold was quenched and the filter removed.

In this case since both the male and female portions of the die are perfectly plane, a flat filter was obtained, but the central portion which had not been compressed initially by the ring was porous while the perimeter which had been compressed by the ring was nonporous. The filter could not be torn at the outer edges by hand, and had a bubble point of 19, an air flow at 1 p. s. i. differential of 300 C. F. M./sq. ft., and a tensile strength of 875 p. s. i.

EXAMPLE 16

A filter was prepared using powdered polytetrafluoroethylene which passed a 90 mesh sieve. In preparing each filter the powder was distributed to a depth of 0.174 inch in flat bottom female mold of stainless steel 0.174 inch deep and coated with Dow Corning silicone resin DC-993 to prevent sticking. The male portion of the mold had box-shaped indentations .050 inch deep with smoothly tapered sides 5/16 x 5/16 inch square on 7/16 inch centers.

The top of the mold was brought down upon the layer of polytetrafluoroethylene at a pressure of 30 to 50 p. s. i. and the mold brought to a temperature of 670 to 690° F. As the polytetrafluoroethylene softened, the top portion of the mold sank into its limiting position, and the portion of the layer confined within the recesses was reduced to .075 inch thick. The layer was sintered while confined in the mold at this temperature for 60 minutes. The mold was quenched and the filter removed. The filters thus obtained were flat on one surface, and the other surface had raised portions. The nonporous portions were .025 inch thick and the raised portions .075 inch thick.

The filter had good flow capacity and could not be torn by hand at any point. It was very flexible and could be bent around small radii.

EXAMPLES 17 TO 22

A group of six filters was prepared using polychlorotrifluoroethylene powder (50 mesh). A circular mold was used. The face of the male member of the mold had a raised ridge portion extending all the way around the perimeter of the face of the mold so that the perimeter of a layer of material in the female member of the mold would be compressed to a greater extent than the center portion of the layer. The recess thus defined in the center part of the male member was 3/32 inch deep.

The polychlorotrifluoroethylene powder of 50 mesh size was filled into the female portion of the mold to a depth of 3/8 inch. The male member of the mold was put into place. The mold then was placed in an oven which was held at the sintering temperature indicated in Table II while a pressure of 40 p. s. i. was applied to the male member. As the powder became soft, the male member of the mold compressed the layer and eventually came to rest at a limiting point at which the perimeter was of minimum thickness at that pressure and the central portion of the layer within the recess of the mold had been reduced to about 1/8 inch thick. Heating at sintering temperature was continued for the time indicated and the mold quenched to bring the temperature down rapidly.

The filters obtained from this mold have a solid nonporous rim corresponding to the raised ridge on the male member of the mold and a porous central portion corresponding to the recessed part of the male member of the mold.

The filters obtained had the following properties:

Table II

| Example No | 17 | 18 | 19 | 20 | 21 | 22 |
|---|---|---|---|---|---|---|
| Process Data: | | | | | | |
| Material size (mesh [1]) | 50 | 50 | 50 | 50 | 50 | 50 |
| Pressure during sintering (p. s. i.) | 40 | 40 | 40 | 40 | 40 | 40 |
| Oven temperature (° F.) | 450 | 500 | 550 | 600 | 650 | 700 |
| Time in oven (minutes) | 35 | 30 | 25 | 20 | 15 | 8 |
| Filter Data: | | | | | | |
| Depth of die (inch) | 3/8 | 3/8 | 3/8 | 3/8 | 3/8 | 3/8 |
| Approx. thickness of nonporous area (inch) | .040 | .040 | .040 | .040 | .040 | .040 |
| Approx. thickness of porous area (inch) | 1/8 | 1/8 | 1/8 | 1/8 | 1/8 | 1/8 |
| Tensile strength (p. s. i.) | 900 | 880 | 910 | 890 | | |
| Alcohol bubble point (mm. Hg) | 20 | 18 | 21 | 19 | 30 | 35 |
| Air flow at 1 p. s. i. differential (C. F. M./sq. ft.) | 360 | 300 | 330 | 360 | 240 | 180 |

[1] Material passes through this mesh.

The filters could not be torn by hand at the outer edges, and were flexible. Even under widely different processing conditions the data shows filters having approximately uniform maximum pore size, permeability and tensile strength can be prepared.

By the process of the invention it is possible to produce filters having any desired size and dimensions. No expensive equipment is required since there is no high pressure compacting step prior to sintering and the sintering is carried out under moderate pressures. The surfaces can be made of any desired configuration to impart a particular external shape to the filters.

The process is capable of producing filters of uniform permeability and dimensions in successive batches. By this process filters have been produced as large as 24 x 24 inches in surface area. To produce a filter as large as this by cold compacting methods would require a pressure of 860,000 pounds, and a large expensive die. The filters are flexible and can be bent around small radii without damage. Because of the high chemical and heat resistance of the fluoroethylene polymers, the filters of the invention can be used to filter commercial acid and alkali solutions and solutions of various materials in any organic solvents, except chlorinated hydrocarbon and molten alkali metals.

The filters having selected porous areas held together by interconnected nonporous areas or nonporous areas with interconnected porous areas have special uses because of their greater strength. The porous and nonporous areas can be at different levels, and can have any desired shape. The raised or depressed areas can have any desired configuration and can be in a regular or irregular pattern, depending upon the requirements. One use of filters having one flat surface and raised porous portions on one surface involves placing two such filters with flat portions out and the raised portions face to face, interlocking to hold the filters in position and defining a channel therebetween so that filtered fluid entering the pair of filters at the flat surfaces thereof emerges into the same channel between the filters and can be collected in one stream. They can be prepared in very large sizes. The nonporous area can be made in the form of a gasket to lock and seal the filter in position in the filtering equipment. The nonporous area can also serve both as an exterior and interior gasket so that a group of filters can be mounted on a central tube or in a system of concentric tubes.

It is thought that the reason for the increased permeability for a given tensile strength and pore size in filters prepared in accordance with the invention relative to filters prepared by cold compacting at high pressures and thereafter sintering, may be seen from the following discussion: During cold pressing, particles are forced into adhesive contact, but do not actually weld to each other, or become truly unified. In the sintering step which follows, only a part of these contacting surfaces develop permanent integral bonding. Many bonds formed during cold pressing are actually completely lost during the unconfined sintering which follows. By contrast using the process of the invention, the particles are forced into contact with each other while the surfaces are softened and adhesive, and all surfaces so forced into contact develop perfect bonding.

It is also thought that blind pores present in the particles as a result of the process of their manufacture are more efficiently released by collapse of the particle walls in the process of the invention, thereby producing filters in which more of the voids are in the form of interconnecting pores.

It will be understood that the invention is not to be limited except as set forth in the appended claims.

We claim:

1. A process of preparing a fluid-permeable filter of fluoroethylene polymer which comprises sintering a layer of particles of fluoroethylene polymer while confining the layer between inert non-adhering surfaces under a pressure within the range from 30–50 p. s. i. at a temperature above the softening temperature and below the melting and decomposition temperatures of the particles.

2. A process in accordance with claim 1 in which the particles are of polytetrafluoroethylene.

3. A process in accordance with claim 1 in which the particles are of polychlorotrifluoroethylene.

4. A process in accordance with claim 1 in which the inert nonadhering surfaces at right angles to the direction of motion during compression are plane surfaces.

5. A process in accordance with claim 1 in which at least one of the inert nonadhering surfaces at right angles the direction of motion during compression has a recessed portion.

6. A process in accordance with claim 1 in which the temperature is within the range from 450° to 700° F.

7. A process of preparing a fluid-permeable filter of fluoroethylene polymer which is nonporous in selected areas which comprises sintering a layer of particles of fluoroethylene polymer having a higher particle density in the areas which are to be nonporous while confining the layer between inert nonadhering surfaces under a pressure within the range from 30–50 p. s. i. at a temperature above the softening temperature and below the melting and decomposition temperatures of the particles.

8. A process of preparing a fluid-permeable filter which is nonporous in selected areas which comprises forming a layer of particles of fluoroethylene polymer on a surface, tamping selected areas of the layer which are to be nonporous, adding additional particles to the tamped areas to increase the particle density thereof, and then sintering the layer while confining it between inert nonadhering surfaces under a pressure within the range from 30–50 p. s. i. at a temperature above the softening temperature and below the melting and decomposition temperatures of the particles.

9. A process of preparing a fluid-permeable filter of fluoroethylene polymer which is nonporous in selected areas which comprises sintering selected areas of a layer of particles of fluoroethylene polymer having a greater thickness in the areas which are to be nonporous while confining the layer between inert nonadhering surfaces under a pressure within the range from 30–50 p. s. i. at a temperature above the softening temperature and below the melting and decomposition temperatures of the particles.

10. A process of preparing a fluid-permeable filter which is nonporous in selected areas which comprises sintering a layer of particles of fluoroethylene polymer while confining the layer between inert nonadhering surfaces provided with recessed areas under a pressure within the range from 30–50 p. s. i. at a temperature above the softening temperature and below the melting and decomposition temperatures of the particles, the pressure being sufficient to reduce the layer to a predetermined thickness, the areas confined within the recesses being porous and the remaining areas nonporous.

11. A fluid-permeable microporous fluoroethylene polymer filter having pores of microscopic dimensions comprising a network in sheet form of interconnected aggregates of united fluoroethylene polymer particles, the aggregates defining open spaces intercommunicating throughout the network to define pores of microscopic dimensions extending from surface to surface of the sheet and uniformly distributed from surface to surface of the sheet for flow therethrough of the filtered fluid, the aggregates thereby constituting a sheet uniform in porosity from surface to surface and having a high tensile strength and flow capacity relative to its void content and pore size.

12. A fluid-permeable filter in accordance with claim 11 in which the particles are of tetrafluoroethylene polymer.

13. A fluid-permeable filter in accordance with claim 11 in which the particles are of chlorotrifluoroethylene polymer.

14. A fluid-permeable microporous fluoroethylene polymer filter comprising a network in sheet form of interconnected aggregates of united fluoroethylene polymer particles, the aggregates being relatively free from internal voids and defining open spaces intercommunicating throughout the network to define pores of microscopic dimensions extending from surface to surface of the sheet and uniformly distributed from surface to surface for flow therethrough of the filtered fluid, the aggregates thereby constituting a sheet uniform in porosity from surface to surface and having a high tensile strength and flow capacity relative to its void content and pore size.

15. A fluid-permeable filter in accordance with claim 14 in which the particles are of tetrafluoroethylene polymer.

16. A fluid-permeable filter in accordance with claim 14 in which the particles are of chlorotrifluoroethylene polymer.

17. A fluid-permeable microporous fluoroethylene polymer filter comprising a network in sheet form of interconnected aggregates of united fluoroethylene polymer particles, the aggregates in at least one area of the filter defining open spaces intercommunicating throughout the network in that area to define pores of microscopic dimensions extending from surface to surface of the sheet and uniformly distributed from surface to surface for flow therethrough of the filtered fluid, the aggregates thereby constituting an area uniform in porosity from surface to surface and having a high tensile strength and flow capacity relative to its void content and pore size, and the aggregates in other areas of the filter being united in a non-porous network structure.

18. A fluid-permeable filter in accordance with claim 17 in which the particles are of tetrafluoroethylene polymer.

19. A fluid-permeable filter in accordance with claim 17 in which the particles are of chlorotrifluoroethylene polymer.

References Cited in the file of this patent

UNITED STATES PATENTS

| | | |
|---|---|---|
| 1,742,411 | Müller | Jan. 7, 1930 |
| 1,815,959 | Wilderman | July 28, 1931 |
| 2,400,091 | Alfthan | May 14, 1946 |
| 2,400,099 | Brubaker et al. | May 14, 1946 |
| 2,403,476 | Berry et al. | July 9, 1946 |
| 2,456,262 | Fields | Dec. 14, 1948 |
| 2,554,343 | Pall | May 22, 1951 |
| 2,573,639 | Coler | Oct. 30, 1951 |

OTHER REFERENCES

Goetzel: "Treatise on Powder Metallurgy," New York: Interscience, 1950, vol. II, pp. 532 and 533.